United States Patent
Okada et al.

(10) Patent No.: US 7,555,126 B2
(45) Date of Patent: Jun. 30, 2009

(54) GAME APPARATUS MANAGING SYSTEM, GAME APPARATUS, CONTROLLING METHOD, COMPUTER PROGRAM AND RECORDING MEDIUM

(75) Inventors: Masahiro Okada, Higashimurayama (JP); Shozo Fukunaga, Hyogo (JP); Akira Takeda, Chiba (JP)

(73) Assignee: Konami Corporation, Tokyo (JP)

( * ) Notice: Subject to any disclaimer, the term of this patent is extended or adjusted under 35 U.S.C. 154(b) by 559 days.

(21) Appl. No.: 10/000,427

(22) Filed: Nov. 30, 2001

(65) Prior Publication Data

US 2002/0085720 A1    Jul. 4, 2002

(30) Foreign Application Priority Data

Dec. 1, 2000    (JP)    ............................. 2000-367280

(51) Int. Cl.
*H04K 1/00* (2006.01)
*H04N 7/167* (2006.01)
*H04L 9/00* (2006.01)
*H04L 9/32* (2006.01)

(52) U.S. Cl. ........................ 380/251; 380/201; 380/202; 380/231; 380/233; 380/239; 380/28; 713/150; 713/184; 713/189; 726/2; 726/27; 705/51; 705/52; 705/57; 705/59

(58) Field of Classification Search .................. 380/251
See application file for complete search history.

(56) References Cited

U.S. PATENT DOCUMENTS

| | | | | |
|---|---|---|---|---|
| 5,761,651 A | * | 6/1998 | Hasebe et al. | ............... 705/400 |
| 5,940,504 A | * | 8/1999 | Griswold | ..................... 705/59 |
| 5,982,887 A | * | 11/1999 | Hirotani | ...................... 705/51 |
| 6,099,408 A | * | 8/2000 | Schneier et al. | ............... 463/29 |
| 6,104,813 A | * | 8/2000 | McRae | ........................ 380/201 |
| 6,468,160 B2 | * | 10/2002 | Eliott | ........................... 463/43 |

(Continued)

FOREIGN PATENT DOCUMENTS

CN      1142068      2/1997

(Continued)

OTHER PUBLICATIONS

Zhaofeng et al, Secure and Flexible Digital Rights Management in a Pervasive Usage Mode, 2007, IEEE, pp. 863-867.*

(Continued)

*Primary Examiner*—Christopher A Revak
*Assistant Examiner*—Aravind K Moorthy
(74) *Attorney, Agent, or Firm*—Bachman & LaPointe, P.C.

(57) ABSTRACT

A license managing apparatus comprises an inputting device, an encrypting device for encrypting information inputted from the inputting device to produce encrypted information, and an outputting device for outputting the encrypted information. The encrypting device encrypts at least identification information of the game apparatus to be licensed and license condition information thereof to produce the foregoing encrypted information. The game apparatus includes an inputting device for inputting the outputted encrypted information, an encryption decoding device for decoding the inputted encrypted information, and a controller for controlling execution of a game program. The game apparatus further includes a storing device for storing identification information of the game apparatus, and a storing device for storing internal information.

17 Claims, 11 Drawing Sheets

U.S. PATENT DOCUMENTS

| | | | |
|---|---|---|---|
| 6,510,502 B1 * | 1/2003 | Shimizu | 711/164 |
| 6,558,259 B1 * | 5/2003 | Maruyama et al. | 463/59 |
| 6,599,194 B1 * | 7/2003 | Smith et al. | 463/30 |
| 6,616,535 B1 * | 9/2003 | Nishizaki et al. | 463/43 |
| 6,659,861 B1 * | 12/2003 | Faris et al. | 463/1 |
| 6,847,942 B1 * | 1/2005 | Land et al. | 705/30 |
| 2005/0071272 A1 * | 3/2005 | Yoshioka et al. | 705/51 |

FOREIGN PATENT DOCUMENTS

| | | |
|---|---|---|
| EP | 0 997 173 | 5/2000 |
| JP | 08-016384 | 1/1996 |
| JP | 09-171575 | 6/1997 |
| JP | 11-085500 | 3/1999 |
| JP | 2000-276350 | 6/2000 |
| JP | 2000-207199 | 7/2000 |
| WO | WO 97/19537 | 5/1997 |
| WO | WO 9831980 A1 * | 7/1998 |

OTHER PUBLICATIONS

Liu et al, Digital Rights Management for Content Distribution, 2003, ACM, pp. 1-10.*

David Henry, Who's Got the Key? 1999, AcM, pp. 106-110.*

* cited by examiner

| APPARATUS ID | PENNY ARCADE INFORMATION | CURRENT LICENSE CONDITION | PAST LICENSE CONDITION | WORKING STATE |
|---|---|---|---|---|
| 001 | AOYAMA PENNY ARCADE | JAN. 1, 2000 TO DEC. 31, 2001 | NO | 15,000 YEN 3000 PLAYING TIMES |
| 002 | AKASAKA GAME SPOT | JUN. 1, 2000 TO JUN. 30, 2000 | NO | 250,000 YEN 2500 PLAYING TIMES |
| ⋮ | ⋮ | ⋮ | ⋮ | ⋮ |
| 0999 | KOBE GAME LAND | FEB. 1, 2000 TO DEC. 31, 2000 | JAN. 1, 1999 TO JAN. 31, 1999 | 10,000 YEN 100 PLAYING TIMES |

FIG. 10

INPUT GAME APPARATUS ID AND PERIOD

GAME APPARATUS ID: AZD — D43— 521— 150

START: 2000 YEAR 06 MONTH 01 DAY

END: 2000 YEAR 06 MONTH 30 DAY

~ • O • ~~~ • O • ~~~ • O • ~~~ • O • ~~~ • O • ~~

PASSWORD IS AS FOLLOWS

PASSWORD: A000265411

FIG. 11

INPUT PASSWORD

PASSWORD: A000265411

~ • O • ~~~ • O • ~~~ • O • ~~~ • O • ~~~ • O • ~~

CONFIRM YOUR RENTAL CONTENTS

MODEL: DANCE DANCE REVOLUTION

START: 2000 YEAR 06 MONTH 01 DAY

END: 2000 YEAR 06 MONTH 30 DAY

SELECT O.K. WHEN THE RENTAL STARTING / ENDING DAY IS CORRECT. WHEN IT IS INCORRECT, PLEASE PUSH CANCEL AND MAKE CONTACT WITH NEAREST SALES OFFICE.

O.K.    CANCEL

FIG. 12

PASSWORD INDICATIVE OF CURRENT WORKING STATE

PASSWORD : C000265411

PLEASE INFORM THE ABOVE PASSWORD TO NEAREST SALES OFFICE.

FIG. 13

INPUT PASSWORD

PASSWORD: C000265411

~・O・~~~・O・~~~・O・~~~・O・~~~・O・~~

WORKING STATE BASED ON PASSWORD IS AS FOLLOWS :

MODEL : DANCE DANCE REVOLUTION
GAME APPARATUS ID : AZD — D43— 521— 150
PAYMENT WITHIN PERIOD : 1,000,000 YEN

FIG. 14

| ITEM | GAME APPARATUS ID | LICENSE METHOD | LICENSE CONTENTS |
|---|---|---|---|
| SET RANGE | FROM 001 TO 009 | 1: PERIOD; 2: THE NUMBER OF PLAYING TIMES; 3: SALES | IN CASE OF LICENSE METHOD=2, THE NUMBER OF PLAYING TIMES IS 1 TO 9999 |
| EXAMPLE 1 | 123 | 2 | 1500 |

_US 7,555,126 B2_

GAME APPARATUS MANAGING SYSTEM, GAME APPARATUS, CONTROLLING METHOD, COMPUTER PROGRAM AND RECORDING MEDIUM

CROSS-REFERENCE TO RELATED APPLICATIONS

This application is based upon and claims the benefit of priority from the prior Japanese Patent Application No. 2000-367280 filed on Dec. 1, 2000, the entire contents of which are incorporated herein by reference.

BACKGROUND OF THE INVENTION

1. Field of the Invention

The present invention relates to a technique for managing a game apparatus such as an arcade game apparatus or the like using encrypted information.

2. Description of the Related Art

There has been known a penny arcade where game apparatuses are set up to have arcadians enjoy playing games and to receive payments in exchange for services rendered from the arcadians. The manager of the penny arcade sets the arcade game apparatus and manages the penny arcade. However, in many cases, the manager does not always possess the game apparatuses. The manager is permitted (licensed) to merely operate the game apparatuses under conditions predetermined between the manager and a supplier (hereinafter referred to as manufacturer) for game apparatus and game software. The manager can set up the game apparatuses in the penny arcade without cost or at very low cost instead of risking the possibility of purchasing the game apparatuses (software), and the manager pays a fixed royalty to the manufacturer from the sales.

Such a business model makes it possible to share the risk and profit speedily and appropriately between the developer of the game apparatus and the manager of the penny arcade as supplying new titles of games in response to the change in taste, which the fickle arcadians have. Then, this will be mainstream from now on in connection with the business model of the penny arcade.

In this business model, it is very important to correctly grasp the actual working state of the game apparatus periodically. Namely, the royalty is collected based on information about how many times the game is played and how many coins are put in the apparatus, and the operation of the game must be stopped when the period of a contract expires.

By the way, since the penny arcades are provided in amusement areas, and sightseeing spots all over the country, the technician must be on a business trip periodically to check the working state of the game apparatus, stop the apparatus whose period of contract has expired, and restart the game apparatus whose period of contract has been renewed, so that extremely much management cost is required.

The penny arcades in many places and the management center of the manufacturer are connected to each other over the network (Internet), a public telephone line and the like, making it possible to mange the game apparatuses at remote sites. However, there is difficulty in adopting such a method of remote control across the board since the facility environment for the penny arcades vary and there is a cost bearing problem.

There can be considered the method in which the management of operating the game apparatuses is left to the penny arcade and billing process is carried out based on the sales report from the penny arcade. This method, however, has a problem in which the actual state of the penny arcade and the truth of the sales report cannot be easily confirmed.

SUMMARY OF THE INVENTION

Therefore, it is an object of the present invention is to provide a technique for managing game apparatuses remotely without providing any special facilities to a penny arcade.

It is another object of the present invention to provide a managing system for a game apparatus, which is capable of starting and stopping an operation of the game apparatus according to a given contract condition and which is capable of transmitting a working state of the game apparatus during that time accurately to a manufacturer without using a data communication line or the like, and to further provide a game apparatus, a controlling method thereof, a computer program and a recording medium recording such a computer program.

According to one aspect of the present invention, there is provided a license managing system including a game apparatus to be licensed and a managing apparatus, the managing apparatus comprising: inputting means; encrypting means for encrypting information inputted from the inputting means to produce encrypted information; and outputting means for outputting the encrypted information, wherein the encrypting means encrypts at least identification information of the game apparatus to be licensed and license condition information thereof to produce the encrypted information, the game apparatus comprising: inputting means for inputting the outputted encrypted information; encryption decoding means for decoding the inputted encrypted information; controlling means for controlling execution of a game program; storing means for storing identification information of the game apparatus; and storing means for storing internal information, wherein the encryption decoding means decodes the encrypted identification information of the game apparatus and the encrypted license condition information, and the controlling means permits execution of the game program when the decoded identification information of the game apparatus and the stored identification information of the game apparatus are in a predetermined relationship, and the decoded license condition information and the stored internal information are in a predetermined relationship.

According to another aspect of the present invention, there is provided a game apparatus comprising: inputting means for inputting encrypted information; encryption decoding means for decoding the inputted encrypted information; controlling means for controlling execution of a game program; storing means for storing identification information of the game apparatus; and calendar means, wherein the encryption decoding means decodes encrypted identification information of the game apparatus and license period information of the game apparatus, and the controlling means permits execution of the game program when the decoded identification information of the game apparatus and the stored identification information of the game apparatus are in a predetermined relationship, and the decoded license period information and date information supplied from the calendar means are in a predetermined relationship.

It may be arranged that the controlling means prohibits execution of the game program when the decoded license period information and the date information supplied from the calendar means fall outside of the predetermined relationship after permitting execution of the game program.

It may be arranged that the game apparatus further comprises information outputting means, wherein the controlling means calculates, after permitting execution of the game program, a remaining period of a license period from a license period ending time indicated in the decoded license period information and the date information supplied from the calendar means, and outputs a predetermined warning to the information outputting means when the remaining period becomes less than a predetermined period.

According to another aspect of the present invention, there is provided a game apparatus comprising: inputting means for inputting encrypted information; encryption decoding means for decoding the inputted encrypted information; controlling means for controlling execution of a game program; first storing means for storing identification information of the game apparatus; and second storing means for storing a working state of the game apparatus, wherein the encryption decoding means decodes encrypted identification information of the game apparatus and operation limiting information of the game apparatus, and the controlling means permits execution of the game program when the decoded identification information of the game apparatus and the stored identification information of the game apparatus are in a predetermined relationship, while the controlling means prohibits execution of the game program when the working state of the game apparatus falls outside of a range of an operation limit specified by the decoded operation limiting information.

It may be arranged that the operation limiting information represents an upper limit of sales of the game apparatus.

It may be arranged that the game apparatus further comprises information outputting means, wherein the controlling means deducts, after permitting execution of the game program, current sales of the game apparatus from the upper limit of sales, and outputs a predetermined warning to the information outputting means when an amount after deduction becomes smaller than a predetermined amount.

It may be arranged that the operation limiting information represents an upper limit of the number of game playing times.

It may be arranged that the game apparatus further comprises information outputting means, wherein the controlling means calculates, after permitting execution of the game program, a remaining number of game playing times from the upper limit of the number of game playing times and a current number of game playing times, and outputs a predetermined warning to the information outputting means when the remaining number of game playing times becomes less than a predetermined number of game playing times.

According to another aspect of the present invention, there is provided a working state managing system including a game apparatus to be managed and a managing apparatus, the game apparatus comprising: storing means for storing identification information of the game apparatus; storing means for storing working state information of the game apparatus; encrypting means for encrypting the identification information and the working state information; information outputting means; and controlling means for causing the encrypting means, according to a predetermined operation, to encrypt the working state information and to output the encrypted working state information in a visible form from the information outputting means, the managing apparatus comprising: inputting means for inputting the encrypted identification information and the encrypted working state information; encryption decoding means for decoding the encrypted identification information and the encrypted working state information; outputting means; and controlling means, wherein when the encrypted identification information and the encrypted working state information are inputted from the inputting means, the controlling means causes the encryption decoding means to decode the information and, according to a request, to output the decoded identification information and the decoded working state information in a visible form from the outputting means.

According to another aspect of the present invention, there is provided a game apparatus comprising: working state storing means for storing working state information; encrypting means for encrypting the stored working state information; information outputting means; and controlling means for causing the encrypting means, according to a predetermined operation, to encrypt the working state information and to output the encrypted working state information in a visible form from the information outputting means.

It may be arranged that the game apparatus further comprises storing means for storing identification information of the game apparatus, wherein the encrypting means encrypts the working state information and the identification information, and the controlling means outputs the encrypted working state information and the encrypted identification information in a visible form from the information outputting means.

It may be arranged that the working state information includes information relating to sales of the game apparatus or information relating to the number of game playing times.

According to another aspect of the present invention, there is provided a license managing method for a game apparatus, wherein a password representing encrypted identification information of the game apparatus to be licensed and encrypted license condition information thereof is transmitted to a licensee, and the licensee inputs the password into the game apparatus to be licensed, and wherein the game apparatus to be licensed executes processing for decoding the inputted password, first determination processing for determining whether or not the decoded identification information and prestored identification information of the game apparatus are in a predetermined relationship, second determination processing for determining whether or not the decoded license condition information and internal information of the game apparatus are in a predetermined relationship, and starts execution of a game program when determination results of the first and second determination processing are both affirmative.

According to another aspect of the present invention, there is provided a method for controlling a game apparatus, wherein the game apparatus executes processing for obtaining a password representing encrypted identification information of the game apparatus and encrypted license condition information thereof, processing for decoding the obtained password, first determination processing for determining whether or not the decoded identification information and identification information stored in the game apparatus are in a predetermined relationship, second determination processing for determining whether or not the decoded license condition information and internal information of the game apparatus are in a predetermined relationship, and permits execution of a game program when determination results of the first and second determination processing are both affirmative.

It may be arranged that execution of the game program is prohibited when the determination result of the second determination processing becomes negative after execution of the program is permitted.

According to another aspect of the present invention, there is provided a method for grasping a working state of a game apparatus, the method comprising: causing the game apparatus to output a password in a visible form, the password representing encrypted identification information of the game apparatus and encrypted working state information thereof, notifying the password to a manager from a managing operator of the game apparatus; inputting the notified password into a managing apparatus by the manager; causing the managing apparatus to decode the password, and to output the decoded identification information of the game apparatus and the decoded working state information thereof in a visible form.

According to another aspect of the present invention, there is provided an information presenting method comprising processing for obtaining identification information of a game apparatus, processing for obtaining working state information of the game apparatus, processing for encrypting the identification information and the working state information, and processing for outputting the encrypted information in a visible form.

It may be arranged that the working state information includes information relating to sales of the game apparatus or information relating to the number of game playing times.

According to another aspect of the present invention, there is provided a computer program for causing a computer to operate as a game apparatus, the computer program causing the computer to execute the steps of: requesting an input of a password representing encrypted identification information of the game apparatus and encrypted license condition information thereof; decoding the inputted password; and permitting execution of a game program when the decoded identification information of the game apparatus and prestored identification information of the game apparatus are in a predetermined relationship and the decoded license condition information of the game apparatus and internal information of the game apparatus are in a predetermined relationship.

According to another aspect of the present invention, there is provided a computer program for causing a computer to operate as a game apparatus, the computer program causing the computer to execute the steps of: obtaining an identification number of the game apparatus; obtaining working state information of the game apparatus; encrypting the obtained identification number and the obtained working state information; and outputting the encrypted information in a visible form.

It may be arranged that the foregoing computer program is recorded in a computer-readable recording medium.

BRIEF DESCRIPTION OF THE DRAWINGS

These objects and other objects and advantages of the present invention will become more apparent upon reading of the following detailed description and the accompanying drawings in which:

FIG. 10 is a view illustrating a display screen page of a license password;

FIG. 11 is a view illustrating a confirmation screen page of a license period;

FIG. 12 is a view illustrating a display screen page of a generated management password;

FIG. 13 is a view illustrating a confirmation screen page of an outputted working state;

FIG. 14 is a view illustrating items that form a code sequence to be encrypted and a setting example of each item.

DETAILED DESCRIPTION OF THE PREFERRED EMBODIMENT

An embodiment of the present invention will be specifically described with reference to the drawings accompanying herewith.

Figure 1:
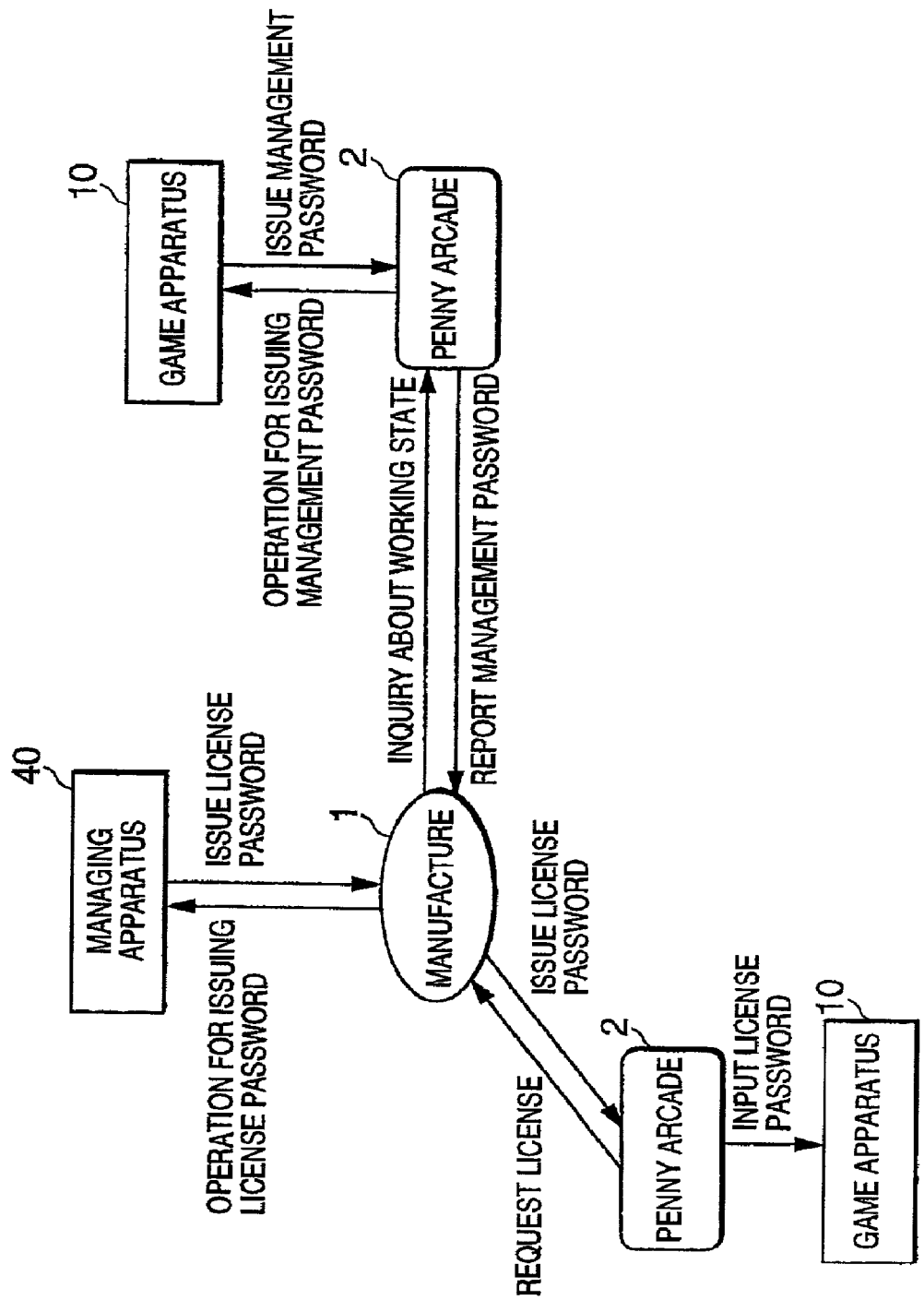
FIG. 1 is a schematic configuration view of a game apparatus managing system according to one embodiment of the present invention.
Figure 2:
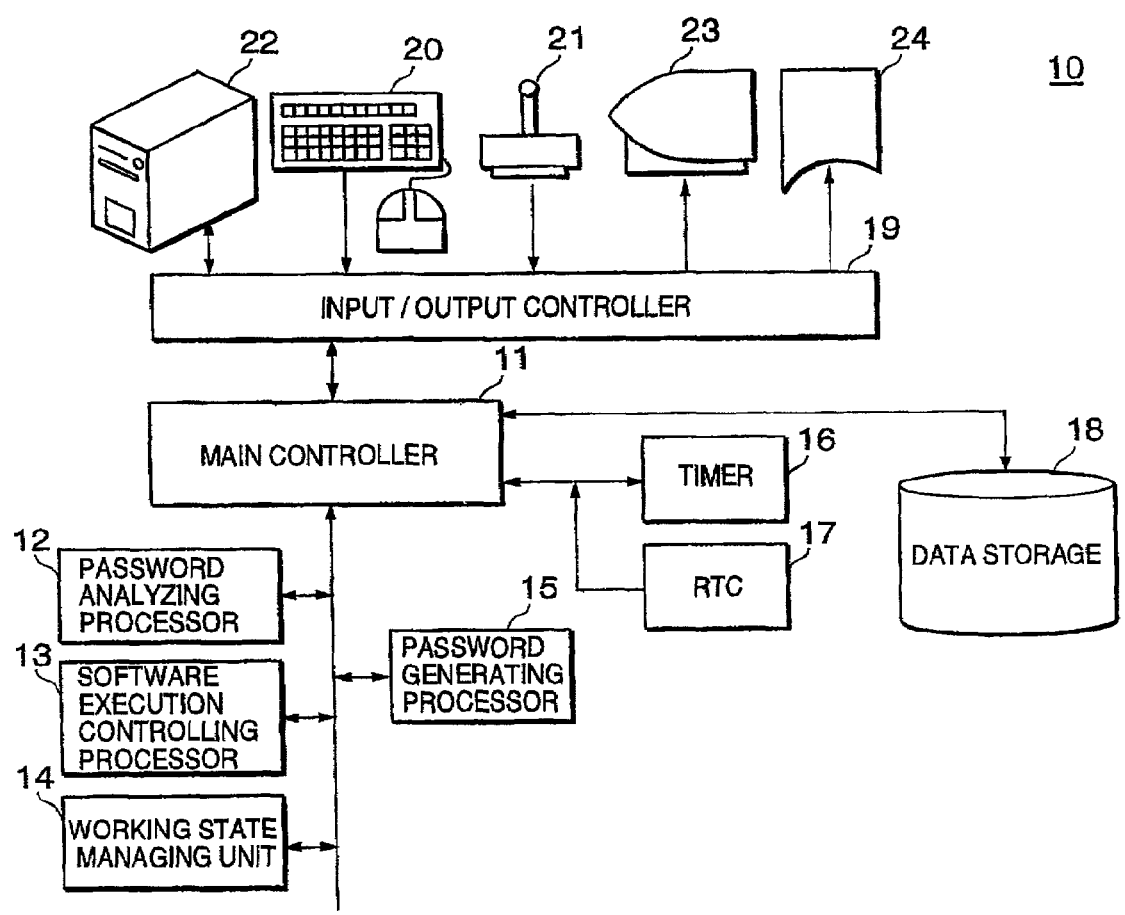
FIG. 2 is a block diagram illustrating the configuration of the game apparatus according to one embodiment of the present invention.
Figure 3:
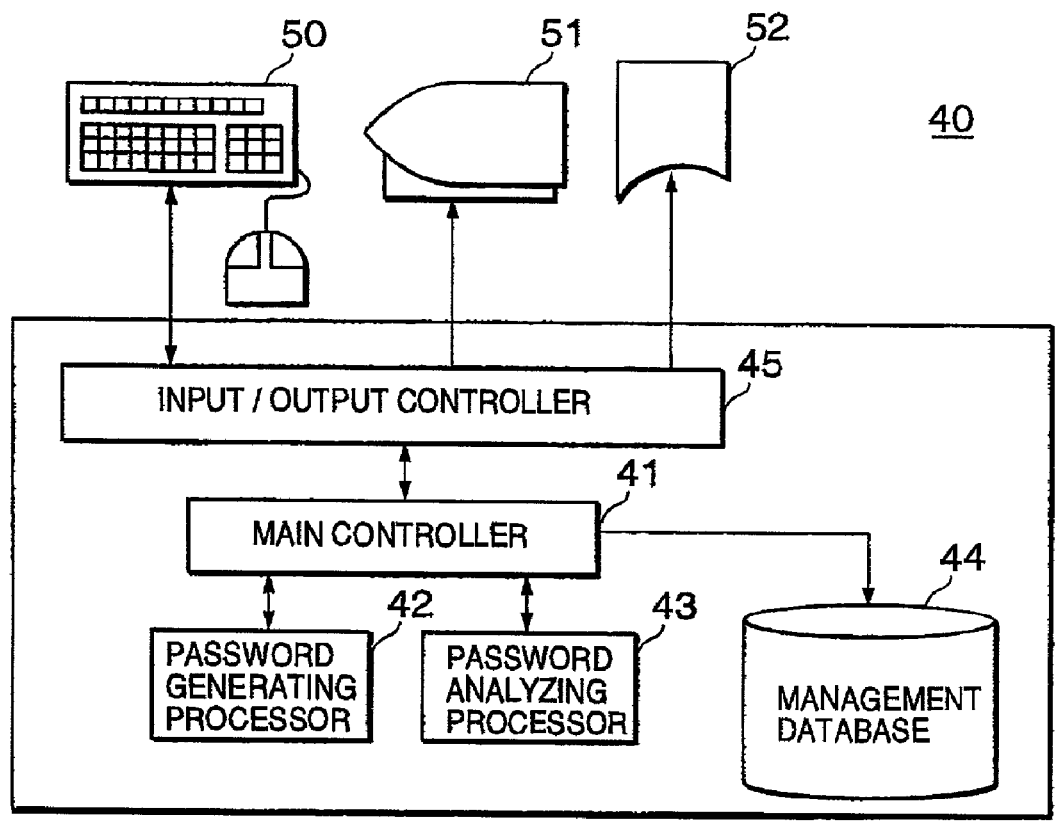
FIG. 3 is a block diagram illustrating the configuration of the managing apparatus according to one embodiment of the present invention.

FIG. 1 is a schematic configuration view of a game apparatus managing system composed of a game apparatus and a managing apparatus, FIG. 2 is a block diagram illustrating the configuration of the game apparatus, and FIG. 3 is a block diagram illustrating the configuration of the managing apparatus.

As illustrated in FIG. 1, the managing system of the game apparatus of this embodiment includes a managing apparatus 40 set up at a manufacturer 1, which is a rental source that rents game apparatuses, and a game apparatus 10 set up at a penny arcade 2, which is a rental destination. Communication between the manufacturer and the penny arcade is performed by communication means such as a normal voice phone, FAX, mail, and the like. Regarding an application for license in connection with the rental of game apparatus, sending a license password to be described later, an inquiry about the working state, and a report on a working state information (management) password, they are carried out using the aforementioned communication means (FIG. 1).

As illustrated in FIG. 2, the game apparatus 10 is composed of a main controller 11 that performs overall control of the operation of the entire game apparatus, a password analyzing processor 12 designated in modules, a software execution controller 13, a working state managing unit 14, a password generation processor 15, a timer 16 that counts time in accordance with date and time information set from an outer unit, a RTC (Real Time Clock) 17 that counts time in accordance with date and time information set at the time of a factory shipment, data storage 18, and an input/output controller 19 that receives various kinds of data inputted from apparatuses such as a game controller 21, a coin storing device 22, a keyboard 20, and the like and outputs information to outputting devices such as a display device 23, a printer 24 and the like.

The main controller 11 and the aforementioned processing and managing modules are implemented when a CPU, which is built in the game apparatus 10, reads a given control program recorded on a control program recording area (not shown) appropriately and executes it. This program may be one that is recorded on a transportable recording medium such as a CD-ROM, and the like. Also, this program may be one that forms the above modules and various kinds of DBs in cooperation with an operating system, which is built in the game apparatus 10 and which is mounted on a computer main body, and/or a BIOS (Basic Input Output System).

The password analyzing processor 12 has a function of analyzing an encrypted game apparatus license data (license password) inputted from the keyboard to return such encrypted data to license data of a plaintext (non-encrypted data). On the other hand, the password generation processor 15 has a function of encrypting working state data of the interior of the game apparatus 10 to generate encrypted working state data (management password). The generated management password is outputted from the aforementioned display device or printer via the input/output controller 19.

Regarding the encrypting and decoding technique used in the password analyzing processor 12 and the password generation processor 15, the encryption technique, which is generally known, for example, DES (Data Encryption Standard) and the like, is used. However, they are not limited to the specific encryption technique and any encryption technique may be possible if it is a technique that makes it difficult to decode the encrypted password in a rational effort range.

The timer 16 is a calendar and timer capable of setting year, month, day, and time from the outer unit. Normally, the manager of the penny arcade sets the date and time at the time of setting up the apparatus, thereafter the timer 16 performs the time counting operation automatically and serves as an internal calendar and timer of the game apparatus 10. The RTC 17 is a timer that performs the time counting operation in accordance with date and time information, which is set based on Greenwich Mean Time at a manufacturing time. The RTC 17 has a unique power source. The use of these timers will be more specifically described later.

The data storage 18 is a storing section for storing a game program executed by the game apparatus and various kinds of data necessary for operating the apparatus.

Figure 4:
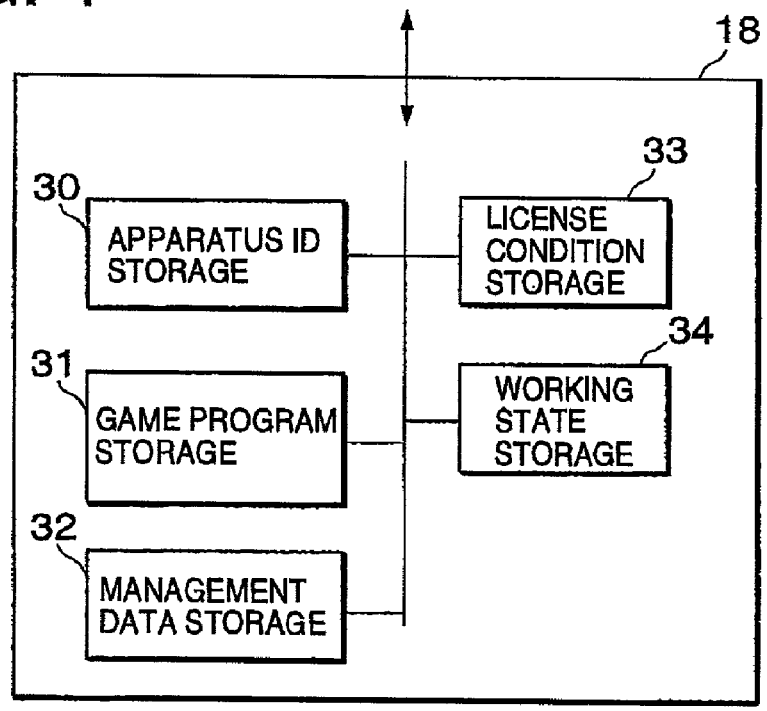
FIG. 4 is a block diagram illustrating the structure of data storage.

FIG. 4 is a block diagram illustrating the structure of the data storage 18. The data storage is composed of apparatus ID storage 30 for storing an identification code (ID) of the game apparatus 10, game program storage 31 for storing a game program executed by the game apparatus 10, management data storage 32 for storing various kinds of data necessary for operating the game apparatus 10, license condition storage 33 for storing a license condition at the time of renting the game apparatus 10, and working condition storage 34 for storing a working (operating) state of the game apparatus.

FIG. 3 is a block diagram illustrating the configuration of a managing apparatus 40. The managing apparatus 40 is composed of a main controller 41 that performs overall control of the operation of the entire game apparatus, a password generating processor 42 designated in modules, a password analyzing processor 43, an input/output controller 45 that receives various kinds of data inputted from apparatuses such as a keyboard 50, a mouse, and the like and outputs information to outputting devices such as a display device 51, a printer 52 and the like, and a management data base (DB) 44 of the game apparatus.

The password generating processor 42 has a function of encrypting ID of the licensing game apparatus inputted from the keyboard and the license condition to generate license data (hereinafter referred to as license password) of the encrypted game apparatus. The password analyzing processor 43 analyzes working state data (hereinafter referred to as management password) of the game apparatus inputted from the keyboard and encrypted to return such encrypted data to management state data of a plaintext (non-encrypted data). The analyzed management password is outputted from the aforementioned display device or printer via the input/output controller 45.

The encryption technique used in the password generating processor 42 must be the same as the encryption technique used in the password analyzing processor 12 of the game apparatus 10. Also, the encryption technique used in the password analyzing processor 43 must be the same as the encryption technique used in the password generating processor 15 of the game apparatus 15. Namely, it is required that the password analyzing processor 12 of the game apparatus 10 should correctly analyze the license password generated by the password generating processor 42 of the managing apparatus 40. Moreover, it is required that the password analyzing processor 43 of the managing apparatus 40 should correctly analyze the management password generated by the password generating processor 15 of the game apparatus 10. It is possible to use the encryption technique common to these password generating and analyzing processors 12, 15, 42, and 43.

Figures 5, 6:
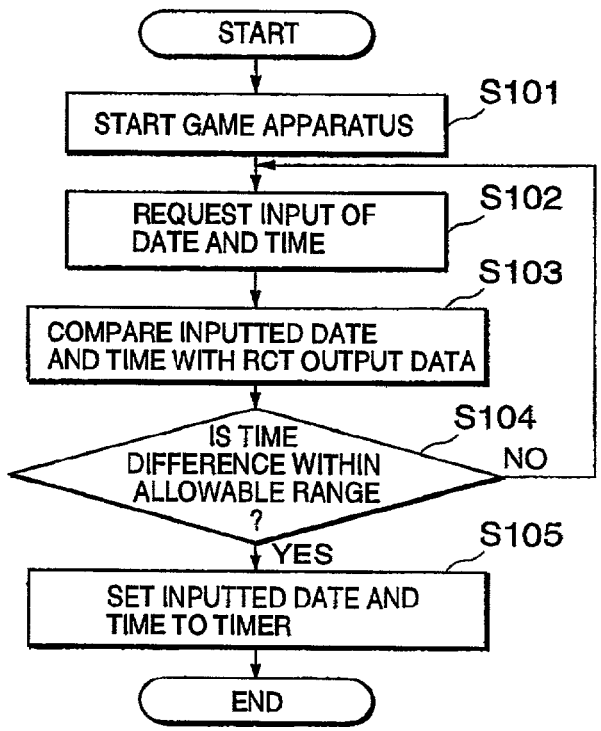
FIG. 5 is a structural view of management DB 44.
FIG. 6 is a flowchart illustrating the operation of a game apparatus according to one embodiment of the present invention.

FIG. 5 is a structural view of management DB 44. The management DB 44 stores at least the apparatus ID data, information (name, address, telephone number, name of company, and the like) of the penny arcade, a current license condition, a past license condition, and data including the latest working state with respect to each of the game apparatuses to be managed. Moreover, it is possible to store a name of a model of the game apparatus to be managed at the same time (not shown).

The main controller 11 and the aforementioned processing (modules) are implemented when a CPU, which a computer main body built in the managing apparatus 10 has, reads a given program recorded on a program storing area (not shown) appropriately and executes it. This program may be one that is recorded on a transportable recording medium such as a CD-ROM, and the like. Also, this program may be one that forms the above modules and various kinds of DBs in cooperation with an operating system, which is mounted on the computer main body built in the managing apparatus 40, and/or a BIOS (Basic Input Output System).

Sequentially, an explanation will be given of the management of the game apparatus using the game apparatus management system according to this embodiment.

First, an initial setting of the game apparatus 10 will be explained with reference to FIG. 6.

It is assumed that the penny arcade newly sets up the game apparatus 10 based on the license contract. When the game apparatus 10 is started (Step 101, hereinafter simply referred to as S), the software execution controller 13 of the main controller 11 reads a start-up control program (not shown) from the management data storage 32 of the data storage 18 and requests the inputs of date sear, month, day) and current time (S102). When the manager of the rental destination enters these inputs, the software execution controller 13 compares information of inputted date and time with date and time outputted from the RTC 17 (S103), and determines whether or not such information is included within a given time difference range (S104). The location where the game apparatus 40 is not limited to Japan, and a predetermined time difference is set to be allowable within an appropriate range as considering the case in the apparatus is set up at the foreign location. In the case where the inputted date and time are within the range of the predetermined time difference (S104: YES), the software execution controller 13 sets the inputted date and time to the timer 16 (S105). In the case where the inputted date and time are not within the range of the predetermined time difference (S104: NO), the software execution controller 13 determines it as an error, and requests the re-input until the suitable date and time are inputted (S102). Thus, comparison between the so-called reference date and time data supplied from the RTC 17 and date and time data to be inputted is performed, and input data, which largely deviates, is not set to the timer 16. This makes it possible to prevent unauthorized operation of date and time data. Even if time set to the timer 16 is lost for some reasons, the current date and time is reset according to the same procedure.

Figure 7:
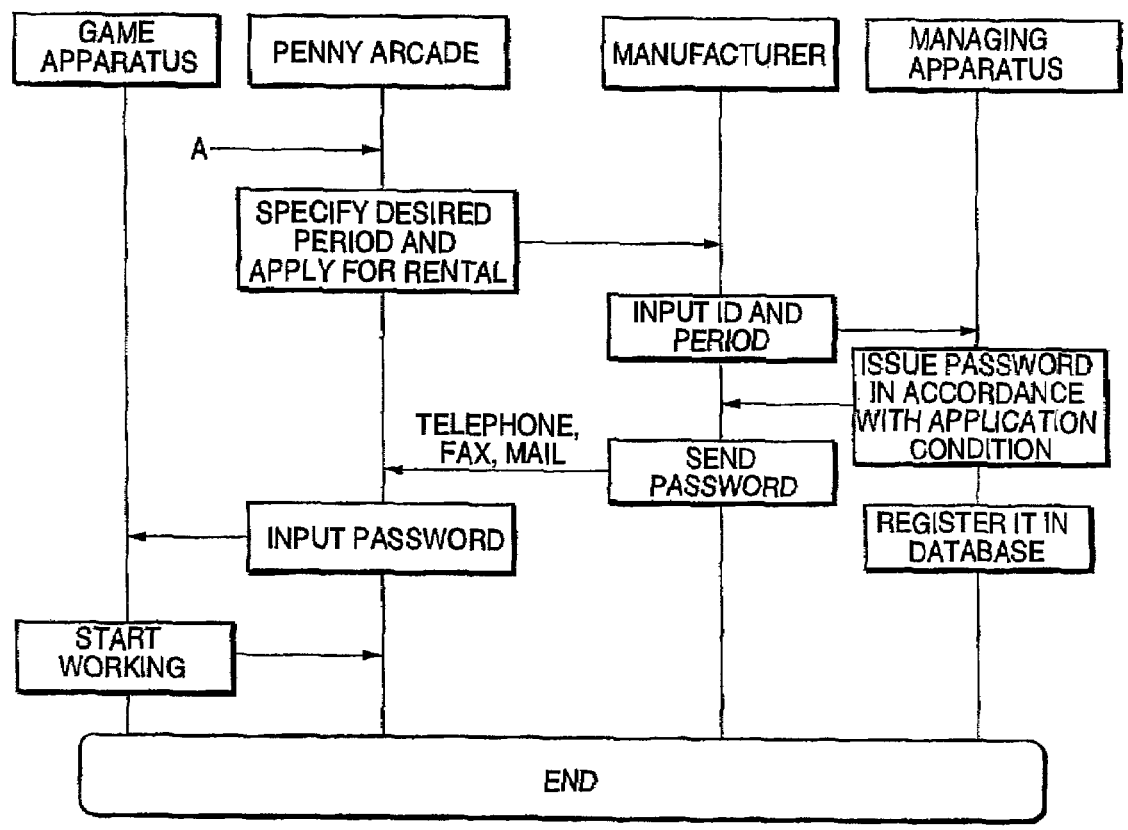
FIG. 7 is a sequence view illustrating the flow of a license management according to one embodiment of the present invention.

An explanation will be next given of the license management of the game apparatus using this management system. FIG. 7 is a sequence view illustrating the flow of the license management. The penny arcade, which wishes to rent the game apparatus, specifies a desired license period and files an application to the manufacturer. The manufacturer inputs ID of the game apparatus to be licensed, the desired license period, and other management information (including data relating to the penny arcade where the apparatus is set up) into the managing apparatus 40. The managing apparatus 40 registers the above-inputted data to the management DB 44, and encrypts ID of the game apparatus to be licensed and the desired license period to generate a license password using the password generating processor 42. FIG. 10 is an example of a screen page illustrating the data input to be displayed on the display device of the managing apparatus 40 and the display of the license password. In the case where ID of the game apparatus is AZD-D43-521-150 and the desired license period is Jun. 1, 2000 to Jun. 30, 2000, a character string of "AZDD43521150A200006012000006120000630" is encrypted using a given encryption technique, and the encrypted character string becomes a license password (e.g., A000265411). The generated license password is outputted from the display device or the printer.

Back to FIG. 7, the manufacturer transmits the generated license password to a licensee via communication means such as a telephone, FAX, mail, and the like.

Figure 9:
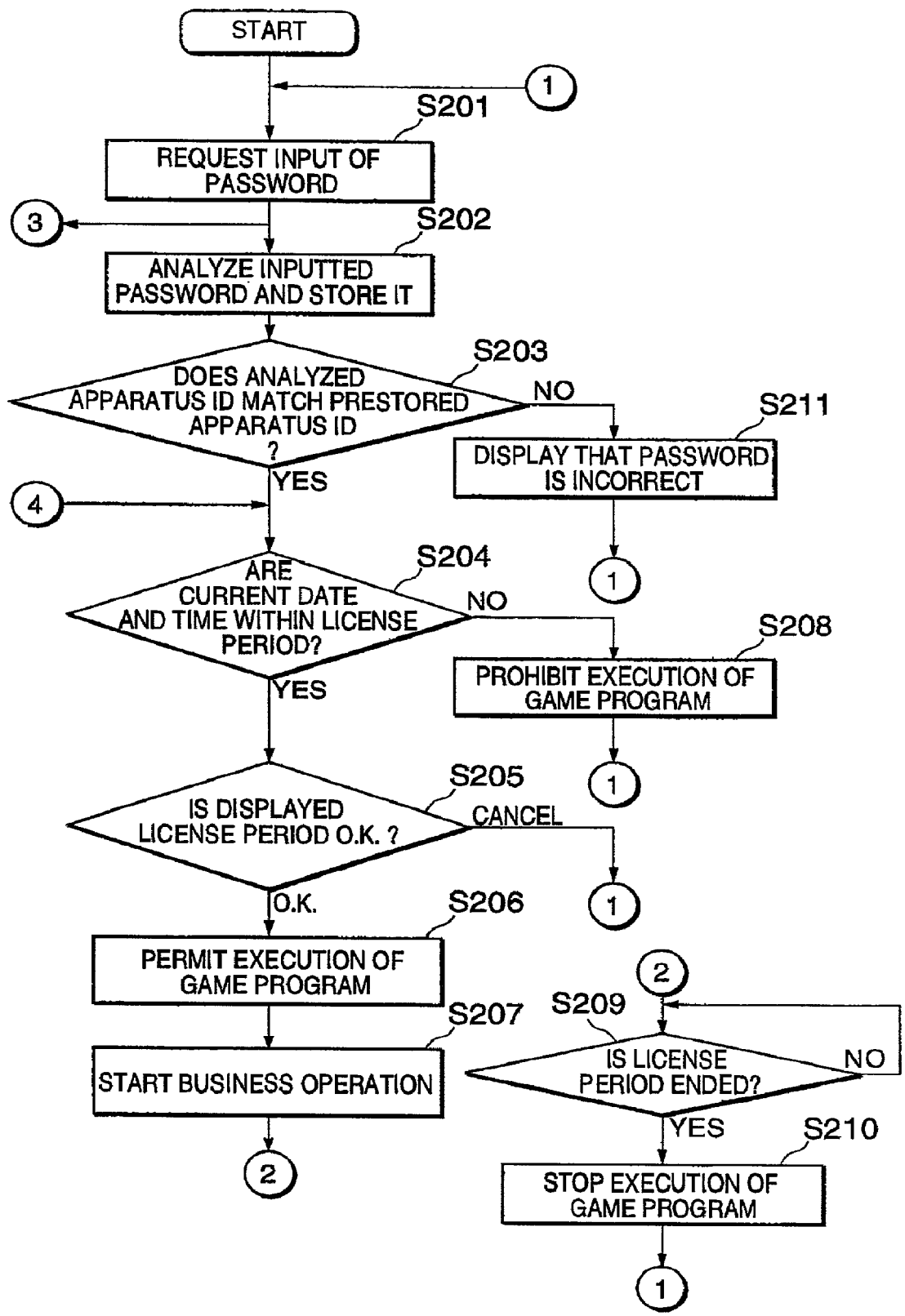
FIG. 9 is a flowchart illustrating the operation of the game apparatus 10 according to one embodiment of the present invention.

An explanation will be next given of the input of the password and the following operation with reference to FIG. 9. FIG. 9 is a flowchart illustrating the operation of the game apparatus 10. The game apparatus 10 requests the input of the license password on the display device (S201). When the licensee inputs the license password from the keyboard, the password analyzing processor 12 analyzes the inputted license password and stores the resultant to the license condition storage 33 (S202).

Sequentially, the software execution controller 13 extracts the game apparatus ID data from the analytical result, and compares the extracted game apparatus ID with ID of the game apparatus 10 prestored in the apparatus ID storage 30 to determine whether they match each other or not (S203). When they do not match each other (S203: NO), the software execution controller 13 displays that the license password is incorrect on the display device (S211), and waits until a new password is inputted (S201). When they match each other (S203: YES), the software execution controller 13 extracts license period data from the analytical result and determines whether or not current date data outputted from the timer 16 is between the license start time and the license end time (S204).

In the case where the determination result is affirmative (S204: YES), the software execution controller 13 displays the analyzed license period on the display device, and confirms whether or not the displayed period is correct (S205). FIG. 11 is a view illustrating an example of the display of the screen page for confirmation. On the screen page, the license period corresponding to the inputted password is displayed, and the licensee can select OK or cancellation from the keyboard or the controller. In the case where the confirmation by the licensee cannot be obtained (S205: cancel), the software execution controller 13 does not permit the execution of the game program, and waits until a new password is inputted (S201).

In the case where the confirmation by the licensee can be obtained (S205: OK), the software execution controller 13 permits the execution of the game program, and the main controller 11 starts the execution of the game program stored in the game program storage 31 (S206).

This makes it possible for the licensee to start the business operation of the game apparatus 10 (S207). After starting the business operation, the working state managing unit 14 of the game apparatus 10 records data of at least the sales (the cumulative number of coins received by the coin storing apparatus) and data of the number of playing times into the working state storage 34 of the data storage 18.

In the case where the determination result is negative (S204: NO), the software execution controller 13 prohibits the main controller 11 from executing the game program stored in the game program storage 31 (S208), and requests the input of the license password again until a suitable license password is inputted (S201). Accordingly, the license cannot start the business operation of the game apparatus 10.

Thereafter, the software execution controller 13 of the game apparatus 10, which has started to execute the game program, determines whether or not current date and time data is between the license start time and the license end time (S209) periodically (e.g., once a day) to check whether or not the license period is not ended.

In the case where the license period has not ended (S209: NO), the software execution controller 13 permits the main controller 11 to continue the execution of the game program.

In the case where the determination result is positive (S209: YES), the software execution controller 13 instructs the main controller 11 to stop the execution of the game program, so that the main controller stops the execution of the game program (S210). After that, the software execution controller 13 requests the input of the license password again (S201). In this case, the software execution controller 13 may display a message stating that the license period is ended on the screen page of the display device concurrently.

From the above explanation, it is understandable that the business operation of the specific game apparatus can be executed for only a given period using the encrypted license password.

Figure 8:
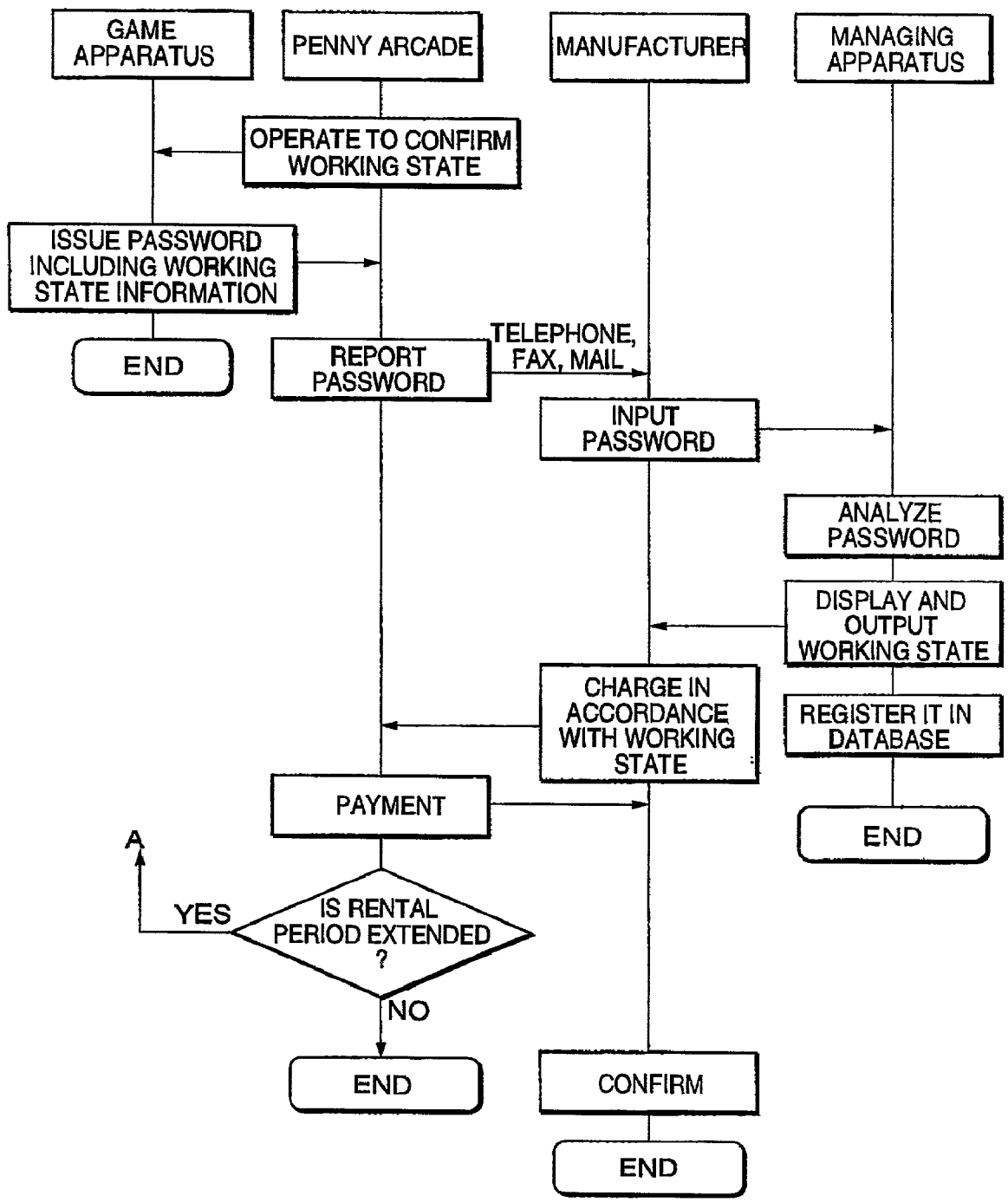
FIG. 8 is a sequence view illustrating the flow of a license management according to one embodiment of the present invention.

An explanation will be next given of the management of the working state of the game apparatus 10 with reference to FIG. 8.

FIG. 8 is a sequence view illustrating the flow of the management of the working state. The licensee is obliged to periodically report the working state of the game apparatus 10 based on the license contract. In this embodiment, it is assumed that the working state data to be reported is a turn-over of the game apparatus (the number of coins received by the coin storing apparatus) and/or the number of playing times. The licensee inputs a predetermined command from the keyboard, thereby instructing the game apparatus 10 to output working state information. On receipt of the instruction, the working state managing unit 14 of the game apparatus 10 extracts the game apparatus ID from the apparatus ID storage 30 and working state data to be reported from the working state storage 34. The password generating processor 15 encrypts the game apparatus ID and working state data to be reported to generate a management password. The generated management password is outputted in a visible form from the display apparatus or the printer. FIG. 12 is a view illustrating one example of the display of the screen page where the game apparatus 10 outputs the generated management password. The licensee transmits the generated management password to the manufacturer via communication means such as a telephone, FAX, mail, and the like.

The manufacturer that has received the management password inputs the management password to the managing apparatus 40. When the management password is inputted from the keyboard, the password analyzing processor 43 of the managing apparatus 40 analyzes the inputted management password. The analyzed working state data is outputted in a visible form from the display apparatus or the printer. FIG. 13 is a view illustrating one example of the display of the screen page where the managing apparatus 40 outputs the inputted management password and the corresponding working state data. Moreover, the analyzed working state data is recorded on the record of the corresponding game apparatus ID of the management database.

Back to FIG. 8, the manufacturer charges the licensee the royalty (license fee) according to the outputted working state based on the condition of the license contract. The licensee that has received the charge for the royalty pays the amount. At this time, in the case where the license period is already ended or comes close to end, the licensee transmits the manufacturer whether the license contract is extended. In the case where the license contract is extended (arrow A, which is connected to the same arrow of FIG. 7), the operation is back to the procedure of FIG. 7, and a new license password is issued in accordance with the aforementioned license password issuing procedure. The manufacturer confirms the payment from the licensee.

From the above explanation, the manufacturer can grasp the working state of the specific game apparatus and charge the licensee the amount using the encrypted license password transmitted from the penny arcade.

Though the above has explained the present invention based on the specific embodiment, and it is needless to say that the present invention can adopt other embodiment without limiting to the above embodiment.

For example, the above embodiment has explained the case in which the manufacturer sets the license period and permits the game apparatus to be operated for only the license period. However, the other conditions may be possible. For example, the arrival at a predetermined sales after starting the operation of the game apparatus may be set as a license ending condition, and the arrival at predetermined number of times the game is played may be set as a license ending condition. In this case, instead of license period data, data indicative of a licensing method (period, the number of playing times or sales) and the content of a license (data indicative of the limit of period, the upper limit number of times the game is played or sales) may be encrypted and put in the license password generated by the managing apparatus 40.

FIG. 14 is a view illustrating items that form a code sequence (numeric sequence) to be encrypted and a setting example of each item according to this alternative embodiment. In the item of the game apparatus ID, ID of the game apparatus to be licensed is inputted. In the item of the license method, any one of 1: period, 2: the number of playing times, 3: sales is inputted by use of the numeric number. In the item of license content, the content is inputted according to the specified license method.

For example, in the case where a license password is generated based on the conditions that the game ID is 123, the license method is 2, and the license condition is 1500 (times), x (=12321500) is calculated using the following equation:

$x$=(game apparatus $ID$×100000)+(license method× 10000)+(license content)

The calculated x is substituted into the known encryption function f(x) to obtain license password y=f(x).

Figure 15:
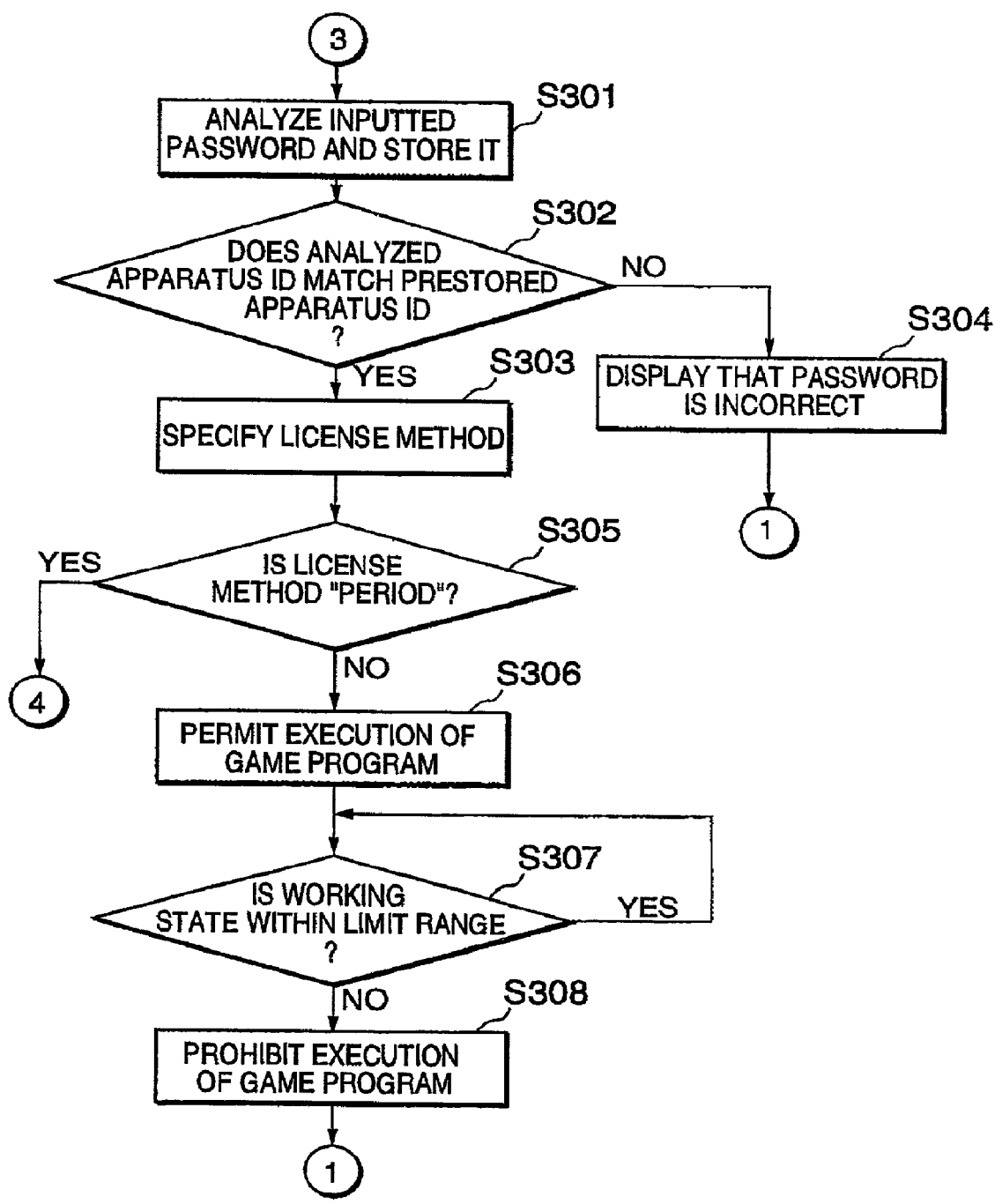
FIG. 15 is a flowchart illustrating the operation of the game apparatus 10 according to another embodiment of the present invention.

FIG. 15 is a flowchart illustrating the operation of the game apparatus 10 using such a license password according to another embodiment of the present invention. This embodiment is different from the aforementioned embodiment in only the operation after S202 of FIG. 9, and only the different operation is illustrated in FIG. 15. First, the password analyzing processor 12 analyzes the inputted license password. Herein, the above license password y is taken as an example, and the analytical operation of the license password is explained.

If the license password y is substituted into a code function g(y), which is an inverse function of the above encryption function, an original code sequence x (=12321500) is uniquely obtained. From the obtained x, a license condition can be given:

Game apparatus $ID$=$x$÷100000

License method=($x$−game apparatus $ID$×100000) ÷10000

License content=($x$−game apparatus $ID$×100000−(license method×1000))

Each data of the given game apparatus ID, license method, and license content is stored in the license condition storage 33 (S301).

The software execution controller 13 extracts the game apparatus ID data from the analytical result, and compares the extracted game apparatus ID with ID of the game apparatus 10 prestored in the apparatus ID storage 30 to determine whether they match each other or not (S302). When they do not match each other (S303: NO), the software execution controller 13 displays that the license password is incorrect on the display device (S304), and waits until a new password is inputted (S201). When they match each other (S302: YES), the software execution controller 13 extracts data of the license method from the analytical result, and specifies the kind of data (S303). In the case where the license method is 1 (period), the operations afterward are the same as those of the aforementioned embodiment, and processing is back to S204 of FIG. 9 (S305: YES).

In the case where the license method is the number other than 1 (namely, the number of playing times or sales) (S305: NO), the software execution controller 13 permits the execution of the game program, and the main controller 11 starts the execution of the game program stored in the game program storage 31 (S306). In the case where the license condition is not the period, comparison and determination relating to the date and time are not performed.

Thereafter, the software execution controller 13 of the game apparatus 10, which has started to execute the game program, checks data stored in the working state storage 34 periodically (e.g., after the end of one game) to determine whether or not the current number of playing times or sales is within the range of the limitation (S307).

In the case where the determination result is affirmative (S307 YES), the software execution controller 13 permits the main controller 11 to continue the execution of the game program. In the case where the determination result is negative (S307: NO), the software execution controller 13 prohibits the main controller 11 from executing the game program (S308), and waits until a new password is inputted (S201).

The above embodiment has explained the case in which the game apparatus 10 is suddenly stopped when the license period expires or the number of playing times or sales exceeds the limitation. However, the following method may be executed.

Namely, it is calculated how many days are left before the license period is ended or how many sales or playing times are left before they reach the limitation. Then, when the remainder of the license period becomes less than predetermined days (e.g., one month) or the remainder of the sales or playing times becomes less than a predetermined value (e.g., 100 Yen or 10 playing times), a screen page urging the manager of the penny arcade to renew the license contract may be displayed on the display device.

From the above explanation, it is understandable that there is disclosed the technique for managing the game apparatuses remotely without providing any special facilities to the penny arcade. According to the present invention, it is possible to start and stop an operation of the game apparatus based on a given contract condition and to transmit the working state during that time accurately to the manufacturer without using a data communication line and the like.

Various embodiments and changes may be made thereunto without departing from the broad spirit and scope of the invention. The above-described embodiment intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A license managing system including a game apparatus to be licensed and a managing apparatus, said managing apparatus comprising:
inputting means;
encrypting means for encrypting information inputted from said inputting means to produce encrypted information; and
outputting means for outputting said encrypted information,
wherein said encrypting means encrypts at least identification information of the game apparatus to be licensed and license condition information thereof to produce said encrypted information, said game apparatus comprising:
inputting means for inputting said outputted encrypted information;
encryption decoding means for decoding said inputted encrypted information;
controlling means for controlling execution of a game program;
storing means for storing identification information of said game apparatus;
storing means for storing internal information; and
real time clock means for counting time in accordance with preset date and time information and outputting date and time information,
wherein said encryption decoding means decodes said encrypted identification information of the game apparatus, said encrypted license condition information, and said controlling means permits execution of the game program when said decoded identification information of the game apparatus and said stored identification information of the game apparatus are in a predetermined relationship, and said decoded license condition information and said stored internal information are in a predetermined relationship, and
wherein said controlling means request an input of date and time information when the game apparatus is started, compare the inputted time and date information with said date and time information of the real time clock means, and execute subsequent process if the inputted time and date information is included within a given time difference range with respect to said date and time information of the real time clock means,
wherein said license condition information includes operation limiting information of the game apparatus, and
wherein said operation limiting information represents an upper limit of sales of the game apparatus or an upper limit of number of game playing times.

2. A game apparatus comprising:
inputting means for inputting encrypted information;
encryption decoding means for decoding said inputted encrypted information;
controlling means for controlling execution of a game program;
storing means for storing identification information of the game apparatus;
calendar means; and
real time clock means for counting time in accordance with preset date and time information and outputting date and time information,
wherein said encryption decoding means decodes encrypted identification information of the game apparatus, license period information of the game apparatus and operation limiting information of the game apparatus, and said controlling means permits execution of the game program when said decoded identification information of the game apparatus and said stored identification information of the game apparatus are in a predetermined relationship, and said decoded license period information and date information supplied from said calendar means are in a predetermined relationship, and
wherein said controlling means request an input of date and time information when the game apparatus is started, compare the inputted time and date information with said date and time information of the real time clock means, and execute subsequent process if the inputted time and date information is included within a given time difference range with respect to said date and time information of the real time clock means,
wherein said controlling means prohibits execution of said game program when a working state of said game apparatus falls outside of a range of an operation limit specified by said operation limiting information, and
wherein said operation limiting information represents an upper limit of sales of the game apparatus or an upper limit of number of game playing times.

3. The game apparatus according to claim 2, wherein said controlling means prohibits execution of said game program when said decoded license period information and said date information supplied from said calendar means fall outside of said predetermined relationship after permitting execution of said game program.

4. The game apparatus according to claim 3, further comprising information outputting means, wherein said controlling means calculates, after permitting execution of said game program, a remaining period of a license period from a license period ending time indicated in said decoded license period information and said date information supplied from said calendar means, and outputs a predetermined warning to said information outputting means when said remaining period becomes less than a predetermined period.

5. A game apparatus comprising:
inputting means for inputting encrypted information;
encryption decoding means for decoding said inputted encrypted information;
controlling means for controlling execution of a game program;
first storing means for storing identification information of the game apparatus;
second storing means for storing a working state of the game apparatus; and
real time clock means for counting time in accordance with preset date and time information and outputting date and time information,
wherein said encryption decoding means decodes encrypted identification information of the game apparatus and operation limiting information of the game apparatus, and said controlling means permits execution of the game program when said decoded identification information of the game apparatus and said stored identification information of the game apparatus are in a predetermined relationship, while said controlling means prohibits execution of said game program when said working state of the game apparatus falls outside of a range of an operation limit specified by said decoded operation limiting information, and
wherein said controlling means request an input of date and time information when the game apparatus is started, compare the inputted time and date information with said date and time information of the real time clock means, and execute subsequent process if the inputted time and date information is included within a given time difference range with respect to said date and time information of the real time clock means,
wherein said operation limiting information represents an upper limit of sales of the game apparatus or an upper limit of number of game playing times.

6. The game apparatus according to claim 5, further comprising information outputting means, wherein said controlling means deducts, after permitting execution of said game program, current sales of the game apparatus from said upper limit of sales, and outputs a predetermined warning to said information outputting means when an amount after deduction becomes smaller than a predetermined amount.

7. The game apparatus according to claim 5, further comprising information outputting means, wherein said controlling means calculates, after permitting execution of said game program, a remaining number of game playing times from said upper limit of the number of game playing times and a current number of game playing times, and outputs a predetermined warning to said information outputting means when said remaining number of game playing times becomes less than a predetermined number of game playing times.

8. A working state managing system including a game apparatus to be managed and a managing apparatus, said game apparatus comprising:
storing means for storing identification information of the game apparatus;
storing means for storing working state information of the game apparatus;
encrypting means for encrypting said identification information and said working state information;
information outputting means;
controlling means for causing said encrypting means, according to a predetermined operation, to encrypt said working state information and to output said encrypted working state information in a visible form from said information outputting means; and
real time clock means for counting time in accordance with preset date and time information and outputting date and time information,
said managing apparatus comprising:
inputting means for inputting said encrypted identification information and said encrypted working state information;
encryption decoding means for decoding said encrypted identification information, said encrypted working state information and operation limiting information;
outputting means; and
controlling means,
wherein when said encrypted identification information and said encrypted working state information are inputted from said inputting means, said controlling means causes said encryption decoding means to decode said information and, according to a request, to output the decoded identification information and the decoded working state information in a visible form from said outputting means, and
wherein said controlling means request an input of date and time information when the game apparatus is started, compare the inputted time and date information with said date and time information of the real time clock means, and execute subsequent process if the inputted time and date information is included within a given time difference range with respect to said date and time information of the real time clock means,
said controlling means of said game apparatus further comprising means for controlling execution of a game program,
wherein said controlling means prohibits execution of said game program when said working state information falls outside of a range of an operation limit specified by said operation limiting information,
wherein said operation limiting information represents an upper limit of sales of the game apparatus or an upper limit of number of game playing times.

9. A game apparatus comprising:
working state storing means for storing working state information;
encrypting means for encrypting said stored working state information;
information outputting means;
controlling means for causing said encrypting means, according to a predetermined operation, to encrypt said working state information and to output said encrypted working state information in a visible form from said information outputting means; and
real time clock means for counting time in accordance with preset date and time information and outputting date and time information,
wherein said controlling means request an input of date and time information when the game apparatus is started, compare the inputted time and date information with said date and time information of the real time clock means, and execute subsequent process if the inputted time and date information is included within a given time difference range with respect to said date and time information of the real time clock means,
wherein said controlling means prohibits execution of game program when said working state information falls outside of a range of an operation limit specified by operation limiting information, wherein said operation limiting information represents an upper limit of sales of the game apparatus or an upper limit of number of game playing times.

10. The game apparatus according to claim 9, further comprising storing means for storing identification information of the game apparatus, wherein said encrypting means encrypts said working state information and said identification information, and said controlling means outputs said encrypted working state information and said encrypted identification information in a visible form from said information outputting means.

11. A license managing method for a game apparatus,
counting time using a real time clock in accordance with preset date and time information and outputting date and time information;
transmitting a password representing encrypted identification information of the game apparatus to be licensed and encrypted license condition information to a licensee, and said password into the game apparatus to be licensed by said licensee;
making a first determination whether or not said decoded identification information and prestored identification information of the game apparatus are in a predetermined relationship;
making a second determination whether or not said decoded license condition information and internal information of the game apparatus are in a predetermined relationship;
executing a game program of the game apparatus when the determination results of said first and second determination processing are both affirmative;
requesting an input of date and time information when the game apparatus is started; comparing the inputted date and time information with said date and time information of the real time clock means; and
executing subsequent processing if the inputted time and date information is included within a given time difference range with respect to said date and time information of the real time clock means,
prohibiting execution of game program of said game apparatus when a working state of said game apparatus falls outside of a range of an operation limit specified by operation limiting information,
wherein said operation limiting information represents an upper limit of sales of the game apparatus or an upper limit of number of game playing times.

12. A method for controlling a game apparatus comprising the steps of:
counting using a real time clock time in accordance with preset date and time information and outputting date and time information;
obtaining a password representing encrypted identification information of the game apparatus and encrypted license condition information thereof;
decoding said obtained password comprising the steps of:
making a first determination whether or not said decoded identification information and identification information stored in said game apparatus are in a predetermined relationship,
making a second determination whether or not said decoded license condition information and internal information of the game apparatus are in a predetermined relationship,
executing a game program of the game apparatus when determination results of said first and second determination processing are both affirmative; and requesting an input of date and time information when the game apparatus is started;
comparing the inputted date and time information with said date and time information counted using said real time clock; and
executing subsequent processing if the inputted time and date information is included within a given time difference range with respect to said date and time information counted using said real time clock,
prohibiting execution of game program of said game apparatus when a working state of said game apparatus falls outside of a range of an operation limit specified by operation limiting information,
wherein said operation limiting information represents an upper limit of sales of the game apparatus or an upper limit of number of game playing times.

13. The method according to claim 12, wherein execution of said game program is prohibited when the determination result of said second determination processing becomes negative after execution of said program is permitted.

14. A method for grasping a working state of a game apparatus, comprising the steps of:
counting time using a real time clock in accordance with preset date and time information and outputting date and time information;
causing the game apparatus to output a password in a visible form, said password representing encrypted identification information of the game apparatus and encrypted working state information thereof, said encrypted working state information includes information relating to sales of said game apparatus or information relating to the number of game playing times;
notifying said password to a manager from a managing operator of said game apparatus;
inputting said notified password into a managing apparatus by said manager;
causing said managing apparatus to decode said password, and to output the decoded identification information of the game apparatus and the decoded working state information thereof in a visible form; and
causing said game apparatus to request an input of date and time information when the game apparatus is started, to compare the inputted time and date information with said date and time information of the real time clock means, and to execute subsequent process if the inputted time and date information is included within a given time difference range with respect to said date and time information of the real time clock,
causing said game apparatus to prohibit execution of game program when said working state information falls outside of a range of an operation limit specified by operation limiting information,
wherein said operation limiting information represents an upper limit of sales of the game apparatus or an upper limit of number of game playing times.

15. An information presenting method for obtaining identification information of a game apparatus comprising the steps of:
counting time using a real time clock in accordance with preset date and time information and outputting date and time information;
obtaining working state information of the game apparatus, processing for encrypting said identification information and said working state information;
outputting said encrypted information in a visible form;
requesting an input of date and time information when the game apparatus is started;

comparing the inputted time and date information with said date and time information of the real time clock; and executing subsequent process if the inputted time and date information is included within a given time difference range with respect to said date and time information of the real time clock, wherein said working state information includes information relating to sales of said game apparatus or information relating to the number of game playing times, causing said game apparatus to prohibit execution of game program when said working state information falls outside of a range of an operation limit specified by operation limiting information, wherein said operation limiting information represents an upper limit of sales of the game apparatus or an upper limit of number of game playing times.

16. A computer-readable recording medium recording a computer program for causing a computer to operate as a game apparatus, wherein said game apparatus comprising real time clock means for counting time in accordance with preset date and time information and outputting date and time information, said computer program causing said computer to execute the steps of:

requesting an input of a password representing encrypted identification information of the game apparatus and encrypted license condition information thereof;

decoding said inputted password;

permitting execution of a game program when said decoded identification information of the game apparatus and prestored identification information of the game apparatus are in a predetermined relationship and said decoded license condition information of the game apparatus and internal information of the game apparatus are in a predetermined relationship; and requesting an input of date and time information when the game apparatus is started, comparing the inputted time and date information with said date and time information of the real time clock means, and executing subsequent process if the inputted time and date information is included within a given time difference range with respect to said date and time information of the real time clock means, prohibiting execution of said game program when a working state of said game apparatus falls outside of a range of an operation limit specified by operation limiting information, wherein said operation limiting information represents an upper limit of sales of the game apparatus or an upper limit of number of game playing times.

17. A computer-readable recording medium recording a computer program for causing a computer to operate as a game apparatus, wherein said game apparatus comprising real time clock means for counting time in accordance with preset date and time information and outputting date and time information, said computer program causing said computer to execute the steps of:

obtaining an identification number of the game apparatus;

obtaining working state information of the game apparatus;

encrypting said obtained identification number and said obtained working state information;

outputting said encrypted information in a visible form; and requesting an input of date and time information when the game apparatus is started, comparing the inputted time and date information with said date and time information of the real time clock means, and executing subsequent process if the inputted time and date information is included within a given time difference range with respect to said date and time information of the real time clock means;

prohibiting execution of game program of said game apparatus when said working state information falls outside of a range of an operation limit specified by operation limiting information, wherein said operation limiting information represents an upper limit of sales of the game apparatus or an upper limit of number of game playing times.

* * * * *